United States Patent
Johnson et al.

(10) Patent No.: US 10,093,440 B2
(45) Date of Patent: Oct. 9, 2018

(54) VERTICAL LOAD CASE PACKER

(71) Applicant: R.A. Pearson Company, Spokane, WA (US)

(72) Inventors: Michael J. Johnson, Spokane, WA (US); Steven Joseph Allard, Spokane, WA (US); Christopher John Banks, Richmond, VA (US)

(73) Assignee: R.A. Pearson Company, Spokane, WA (US)

( * ) Notice: Subject to any disclaimer, the term of this patent is extended or adjusted under 35 U.S.C. 154(b) by 767 days.

(21) Appl. No.: 14/602,138

(22) Filed: Jan. 21, 2015

(65) Prior Publication Data

US 2015/0203228 A1 Jul. 23, 2015

Related U.S. Application Data

(60) Provisional application No. 61/929,816, filed on Jan. 21, 2014.

(51) Int. Cl.
*B65B 43/39* (2006.01)
*B65G 15/14* (2006.01)
*B65B 35/40* (2006.01)
*B65B 39/12* (2006.01)
*B65B 43/52* (2006.01)
*B65B 5/06* (2006.01)
*B65G 21/22* (2006.01)

(52) U.S. Cl.
CPC .............. *B65B 43/39* (2013.01); *B65B 5/061* (2013.01); *B65B 35/40* (2013.01); *B65B 39/12* (2013.01); *B65B 43/52* (2013.01); *B65G 15/14* (2013.01); *B65G 21/22* (2013.01); *B65G 2201/0267* (2013.01)

(58) Field of Classification Search
CPC ......... B65B 43/39; B65B 5/061; B65B 35/40; B65B 39/12; B65B 43/52; B65G 15/14; B65G 21/22; B65G 2201/0267
USPC ......... 53/531, 540, 566, 235, 247, 252, 255, 53/258, 246; 198/339.1
See application file for complete search history.

(56) References Cited

U.S. PATENT DOCUMENTS 2,559,318 A * 7/1951 Rice .......................... B65B 5/06
414/913
2,652,137 A * 9/1953 Taranto ................... B65B 43/52
198/464.2

(Continued)

*Primary Examiner* — Michelle Lopez
*Assistant Examiner* — Lucas Palmer
(74) *Attorney, Agent, or Firm* — Lee & Hayes, PLLC

(57) ABSTRACT

In one example of a vertical load case packer, guide rods provide horizontal adjustment of a tipping conveyor assembly to position the tipping conveyor assembly at a desired distance from the at least one bucket assembly. In operation, an indexing assembly advances case(s) into the tipping conveyor assembly. Side belts in the tipping conveyor assembly move and grip the case(s). A pivot rotates the tipping conveyor from a position wherein an open end of a case is oriented upwardly to a position wherein the open end is oriented horizontally to receive the product. Each bucket assembly receives product and delivers it to a case. A sliding bottom plate in the bucket assembly supports horizontally loaded product and advances the product into a case. A pusher plate prevents product from withdrawing from the case as the sliding bottom plate is withdrawn and further inserts the product into the case if needed.

18 Claims, 18 Drawing Sheets

(56) References Cited

U.S. PATENT DOCUMENTS

| | | | | |
|---|---|---|---|---|
| 2,736,998 A * | 3/1956 | Walrave | B65B 43/285 | 493/309 |
| 2,827,082 A * | 3/1958 | Baum | B65B 25/046 | 141/154 |
| 2,840,224 A * | 6/1958 | Lefief | B65G 17/002 | 198/461.1 |
| 2,985,323 A * | 5/1961 | Wilson | B65B 27/08 | 198/409 |
| 3,074,215 A * | 1/1963 | Deines | B65B 35/40 | 53/243 |
| 3,323,283 A * | 6/1967 | Johnson, Jr. | B65B 43/54 | 414/736 |
| 3,388,527 A * | 6/1968 | Vadas | B65B 5/06 | 53/247 |
| 3,735,561 A * | 5/1973 | Wood | B65B 5/08 | 53/245 |
| 3,756,374 A * | 9/1973 | Burt | B65G 37/00 | 198/358 |
| 3,890,764 A * | 6/1975 | Hartman | B65B 5/08 | 53/500 |
| 4,199,918 A * | 4/1980 | Peterson | B65B 35/36 | 294/87.26 |
| 4,224,781 A * | 9/1980 | Salenbo | B65B 43/54 | 53/249 |
| 4,249,847 A * | 2/1981 | Tokuno | B65H 1/30 | 198/407 |
| 4,329,831 A * | 5/1982 | Warkentin | B65B 5/10 | 53/240 |
| 4,534,153 A * | 8/1985 | Nowicki | B65B 21/14 | 198/412 |
| 4,600,351 A * | 7/1986 | Nelson | A01K 45/005 | 119/846 |
| 4,979,870 A * | 12/1990 | Mojden | B65G 47/5181 | 294/87.1 |
| 5,086,905 A * | 2/1992 | Polling | B65G 47/96 | 198/370.03 |
| 5,160,013 A * | 11/1992 | McDowell | B65G 47/248 | 193/45 |
| 5,515,664 A * | 5/1996 | Tanaka | B65B 5/06 | 53/243 |
| 5,560,471 A * | 10/1996 | Prochut | B65G 47/82 | 198/395 |
| 5,692,877 A * | 12/1997 | Sixtensson | B65H 29/14 | 271/215 |
| 5,938,097 A | 8/1999 | Lam | | |
| 6,003,284 A | 12/1999 | Goodman | | |
| 6,047,527 A * | 4/2000 | Pazdernik | B65B 5/061 | 53/247 |
| 6,176,367 B1 * | 1/2001 | Patrito | B62D 65/18 | 198/465.3 |
| 6,199,681 B1 * | 3/2001 | Ballos, III | B65G 21/10 | 198/456 |
| 6,220,420 B1 * | 4/2001 | Jan | B65G 47/268 | 198/369.1 |
| 6,390,278 B1 * | 5/2002 | Brown | B65G 47/647 | 193/35 SS |
| 6,438,928 B1 * | 8/2002 | Huang | B65B 5/108 | 53/249 |
| 6,574,943 B2 * | 6/2003 | Van Dam | B65B 5/061 | 414/790.3 |
| 6,725,629 B2 * | 4/2004 | Pearce | B65B 5/106 | 53/239 |
| 6,959,525 B2 * | 11/2005 | Prakken | B65B 5/061 | 53/249 |
| 7,137,234 B2 * | 11/2006 | Caporali | B65B 25/143 | 53/249 |
| 7,156,222 B2 * | 1/2007 | Schnuelle | B65B 43/14 | 198/626.3 |
| 7,275,635 B2 * | 10/2007 | Enya | B65G 37/02 | 198/463.2 |
| 7,607,882 B2 * | 10/2009 | Matalevich | B42C 19/08 | 198/403 |
| 8,689,530 B2 * | 4/2014 | Prahm | B65B 5/061 | 53/247 |
| 2002/0070097 A1 * | 6/2002 | Ritter | B65B 43/52 | 198/626.1 |
| 2003/0108416 A1 * | 6/2003 | Schererz | B65B 43/54 | 414/794.4 |
| 2006/0180434 A1 * | 8/2006 | Arnold | B07C 3/008 | 198/463.3 |
| 2006/0180435 A1 * | 8/2006 | Swider | B07C 3/008 | 198/463.3 |
| 2011/0167771 A1 * | 7/2011 | Till | B65B 5/061 | 53/475 |

\* cited by examiner

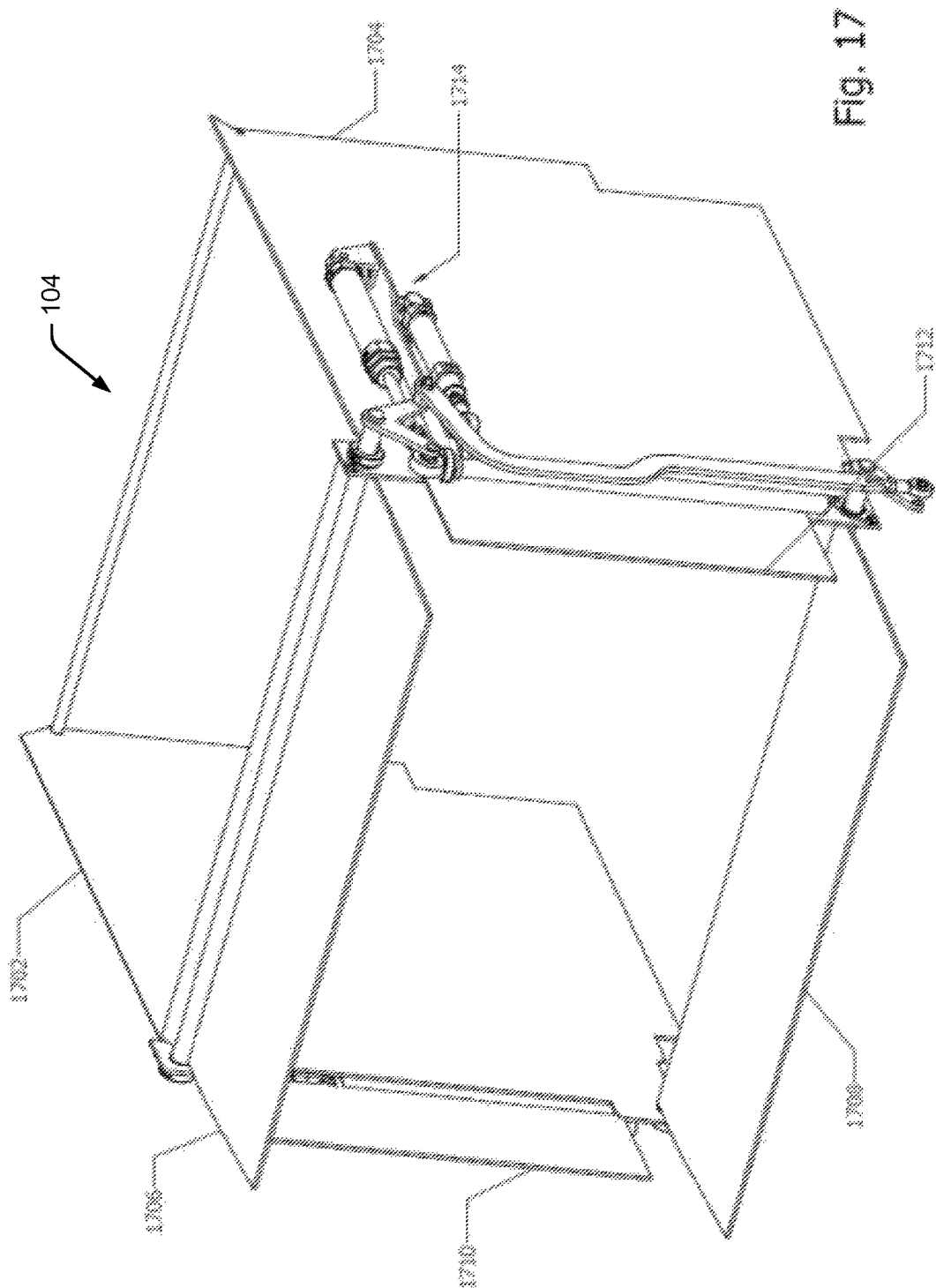

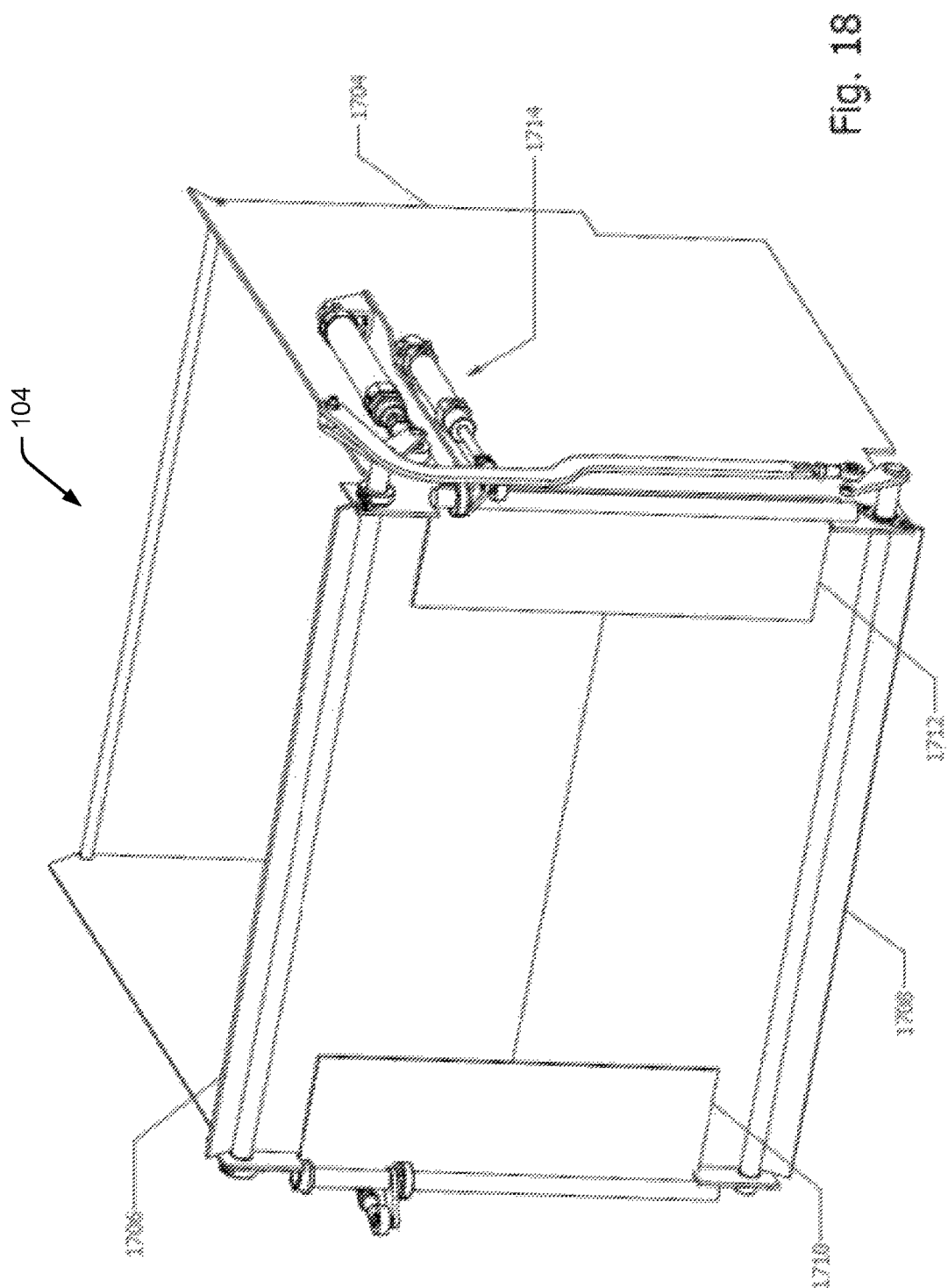

VERTICAL LOAD CASE PACKER

RELATED APPLICATIONS

This application claims the benefit of U.S. Provisional Application No. 61/929,816 filed on Jan. 21, 2014 which is incorporated by reference herein in its entirety.

BACKGROUND

Automated case packing equipment is used to pack cases (e.g., cardboard boxes) with product for shipment. Product could be any of a vast number of items, such as flexible bags of coffee, nuts, candy, laundry detergent, etc. A vertical load case packer may load product so that it is oriented vertically (that is, each item is standing up, not on its side) when the case is right side up.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

FIG. 17 is a perspective view of a bucket assembly with flaps open to allow product to exit.

FIG. 18 is a perspective view of a bucket assembly with flaps closed to allow product to be placed into the bucket assembly, such as by a picker (not shown).

DETAILED DESCRIPTION

Overview

Figure 1:
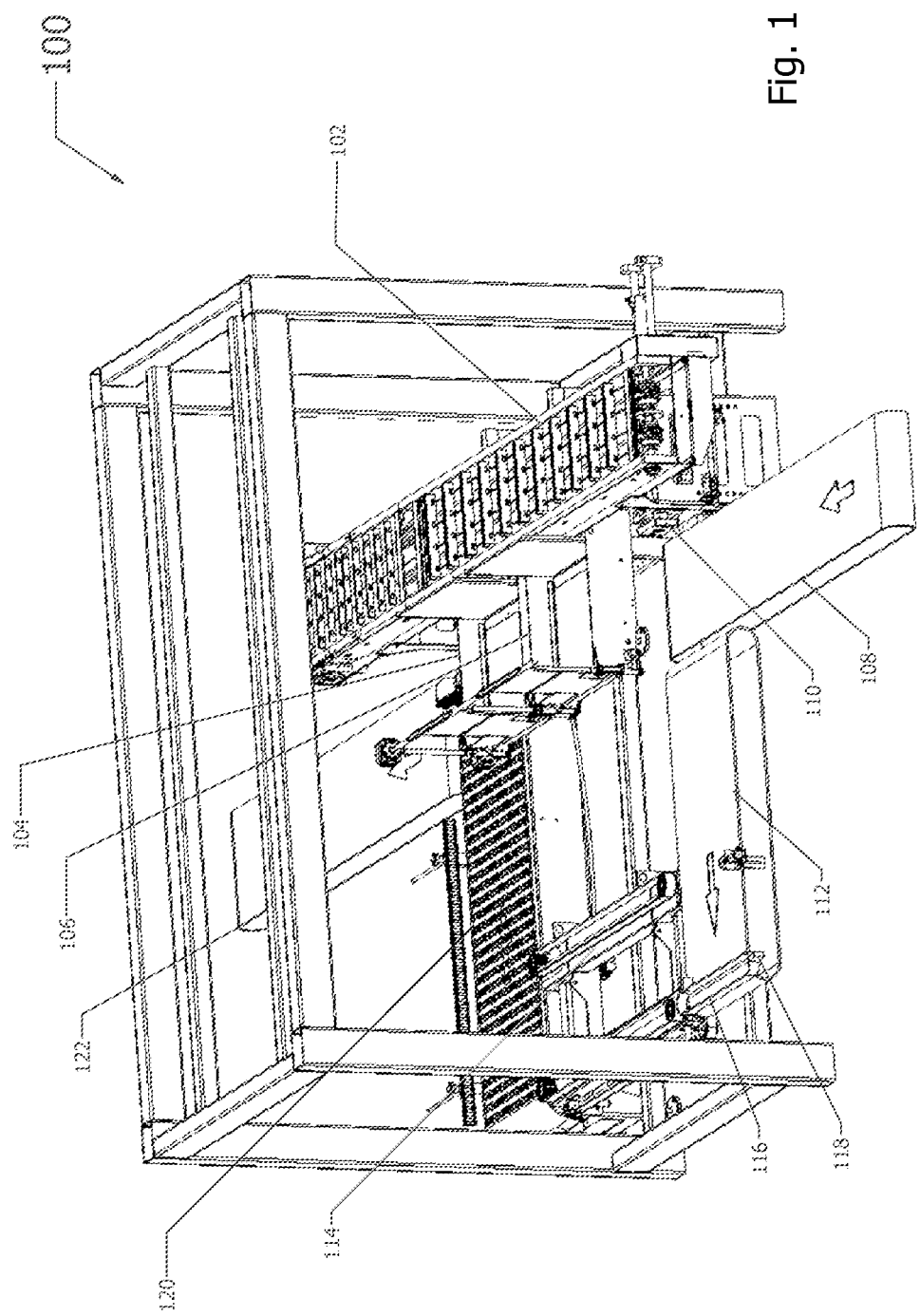
FIG. 1 is a perspective view of an example of a vertical load case packer, showing examples of a number of techniques, and to thereby illustrate more general systems, methods and inventive concepts discussed herein.

The disclosure describes techniques for providing and operating a vertical load case packer. In one example of a vertical load case packer, guide rods allow horizontal movement of a tipping conveyor assembly to position the tipping conveyor assembly at a desired distance from the at least one bucket assembly. In operation, an indexing assembly advances case(s) into the tipping conveyor assembly. Side belts in the tipping conveyor assembly move and grip the case(s). The tipping conveyor rotates about a pivot from a position wherein an open end of a case is oriented upwardly to a position wherein the open end is oriented horizontally to receive the product. Each bucket assembly receives product and delivers it to a case. A sliding bottom plate in the bucket assembly supports horizontally loaded product and advances the product into a case. A pusher plate prevents product from withdrawing from the case as the sliding bottom plate is withdrawn and further inserts the product into the case if needed.

Indexing Assembly to Provide Cases to a Tipping Conveyor Assembly

In one example of the vertical load case packer, an indexing assembly is configured to advance one or more cases, separated according to a selectable spacing, onto a tipping conveyor assembly. The indexing assembly may have a lugged flight assembly, configured so that programming directs operation of servo motors to control spacing between cases as they are advanced by the lugged flight assembly. Accordingly, a position and/or a timing of one or more cases is controlled as the case(s) enter the tipping conveyor assembly. The tipping conveyor assembly may be configured without flight lugs, to allow selectable or prescribed spacing of cases without the need to adjust or replace a lugged flight assembly. In one example, the tipping conveyor assembly may include servo driven side belts which frictionally engage the case(s) as they enter the tipping conveyor assembly.

In example operation, programming controls operation of servo motor(s) of the indexing assembly to move flight lugs in a prescribed manner. A case may initially be stopped by a flight lug, until indicated by a prescribed time or event. The case may then be advanced by a flight lug to propel it onto the tipping conveyor assembly. Accordingly, the programming, structure and operation of the indexing assembly positions each case so that each is correctly and timely located within the tipping conveyor assembly (e.g., before that assembly tips by 90-degrees to orient an open top of a case to open horizontally).

Tipping Conveyor Assembly Adjustable by Case Size and Orientation

As seen above, the indexing assembly indexes one or more cases into the tipping conveyor assembly. The tipping conveyor assembly pivots or rotates the one or more cases to orient the opening of the case(s) horizontally, to receive product from the bucket assemblies. Product is stacked within the bucket assemblies, so that when the product is side-loaded into the cases, and the tipping conveyor assembly pivots or rotates the cases to the vertical, the product will be vertically oriented within the cases.

Accordingly, a tipping conveyor assembly is configured to receive one or more cases with an open end oriented vertically. The one or more cases may be positioned at known, fixed or programmed locations and separations, such as by an indexing assembly. The tipping conveyor assembly may utilize adjustable servo-driven side belts to squeeze the case(s) from two opposed sides and to control speed, timing and location of the case(s) as they move through the conveyor assembly. The tipping conveyor assembly may utilize adjustment means, such as a guide rod and bearing surfaces, to adjust a distance between the tipping conveyor assembly and one or more bucket assemblies used to receive incoming product for loading into the product into the case(s). In one example, the tipping conveyor is moved toward the bucket assembly when the cases are smaller. However, larger cases require more room, and the tipping conveyor assembly may be adjusted more distantly from the bucket assembly to provide space for the cases after 90-degree rotation toward the bucket assembly. The tipping conveyor assembly may include a pivot or axle to allow pivoting or "tipping" of the tipping conveyor assembly to position the case(s) with the open end oriented horizontally. Such pivoting allows each case to be side loaded by a bucket assembly. The pivot allows the tipping conveyor assembly to return the case(s) to an upright orientation after loading, wherein the open top is oriented upwardly and the product is vertically loaded.

In operation, the tipping conveyor assembly is initially configured to a position (e.g., such as by moving on guide rods) that is a distance from the bucket assembly based at least in part on a size of a case to be packed. One or more cases may be received by the tipping conveyor assembly from an indexing assembly. Adjustable servo-driven side belts contact each side of the case(s) to move the case(s) to predetermined locations on the tipping conveyor assembly. The tipping conveyor assembly may pivot from a position wherein a case opening is vertically oriented to a position wherein the case opening is horizontally oriented. The case may be loaded with product by a bucket assembly. The tipping conveyor assembly may then pivot to a position wherein the case is vertically oriented.

Sliding Bottom Plate and Pusher Plate in a Bucket Assembly

As seen above, the indexing assembly indexes one or more cases into the tipping conveyor assembly. The tipping conveyor assembly may then pivot or rotate the one or more cases to orient the opening of the case(s) horizontally, to receive product from one or more bucket assemblies.

Each bucket assembly may include a sliding bottom plate and a pusher plate. The sliding bottom plate may be configured to support horizontally stacked product, such as cartons, boxes or bags (e.g., bags of candy), etc., and move the product to or into a horizontally (side) oriented opening of a case. The pusher plate is vertically oriented and is configured to prevent the product from retracting as the sliding bottom plate is slid out from under the product and to push the product further into the case, if needed.

In operation, product is loaded into the bucket assembly. The bucket assembly loads the product into a case (e.g., cardboard box) having an opening that is horizontally oriented (i.e., the open top of the box points to the side). In particular, the sliding bottom plate supports a stack of horizontally layered product (e.g., two or more items stacked one atop another). The sliding bottom may advance the stacked product either: (1) to the open entrance of case; (2) part way into the case; or (3) fully or almost fully into the case. A determining factor of how far the sliding bottom plate advances the layered product into the case is whether there is enough room for the sliding bottom plate and the product in the case. After the sliding bottom plate has advanced to an appropriate distance into the case, it is withdrawn. The pusher plate may perform at least two functions. First, the pusher plate may prevent the product from withdrawing from the case as the sliding bottom plate is slid out from under the stacked product. Second, the pusher plate may push the product further into the case, if it is not already fully inserted. The sliding bottom plate and the pusher plate are then fully withdraw, leaving the product fully positioned in the case, with the open top oriented horizontally. The tipping conveyor assembly then tips the case(s) to a vertical orientation.

Example Systems and Techniques

FIG. 1 is a perspective view of an example of a vertical load case packer 100. A product in-feed conveyor 102 is configured to deliver product, such as individually wrapped consumer items. The product could be any of a wide range of products, packaged in cartons, boxes or bags (e.g., bags of candy, popcorn, rice, beans), etc. In one example, the product items are bagged items (like a bag of popcorn) that are flexible and therefore difficult to place vertically into a case unless the case is filled by inserting all of the items simultaneously. For example, a case sized to hold a dozen bags of popcorn could be difficult to place vertically into a case one by one, because each vertically oriented bag might "slouch over" into space required by another bag. In another example, the product could be packaged in cartons, which may be difficult to load vertically by conventional techniques.

The product arriving by the product in-feed conveyor 102 is placed into one or more bucket assemblies. In the example of FIG. 1, two bucket assemblies 104, 106 are illustrated. The bucket assemblies may be loaded by a product picking apparatus (not shown) which may utilize suction cups or other techniques to grab each bag or carton and place it into a bucket assembly. In a typical example, the product is oriented horizontally (e.g., stacked) into the bucket assemblies, and can therefore be placed one after another without each bag (or carton) moving into another bag's space. Later in the process, when the case is turned sideways, the product will be vertically oriented within the case.

A case in-feed conveyor 108 moves assembled cases (e.g., cardboard boxes) into the vertical load case packer 100. A pusher or kicker 110 moves each case onto a lateral transit conveyor 112. A length of the lateral transit conveyor 112 may be selected based at least in part on a position of the tipping conveyor assembly 114. That is, if the tipping conveyor assembly 114 is closer to the bucket assemblies 104, 106 (e.g., because the case size is smaller, and required less room when tipped) then the lateral transit conveyor 112 may be shorter. However, if the tipping conveyor assembly 114 is further from the bucket assemblies 104, 106 (e.g., because the case size is larger, and requires more room when it is tipped) then the lateral transit conveyor 112 may be longer.

An indexing assembly 116 is configured with a drive belt having one or more flight lugs 118. The flight lugs may either stop a case or move a case. For example, a flight lug may stop a case from moving until a particular time or event occurs. After the time or event occurs, a flight lug may engage and propel a case into the tipping conveyor assembly 114. The drive belt and flight lug(s) 118 of the indexing assembly may be controlled by servo motor(s) and may be programmable. Accordingly, the timing by which each case is pushed onto the tipping conveyor assembly 114 may be controlled.

As will be discussed in greater detail with respect to other drawing figures, the tipping conveyor assembly 114 pivots to orient the empty cases on their sides, which allows the bucket assemblies to side-load the cases. Once loaded, the cases are pivoted into the upright orientation and moved by the tipping conveyor assembly 114 onto a loaded-case lateral-transit conveyor 120. The loaded-case lateral-transit conveyor 120 may utilize an Itralox® active roller belt (ARB) or similar technology to drive the filled cases onto an out-feed conveyor 122.

Figure 2:
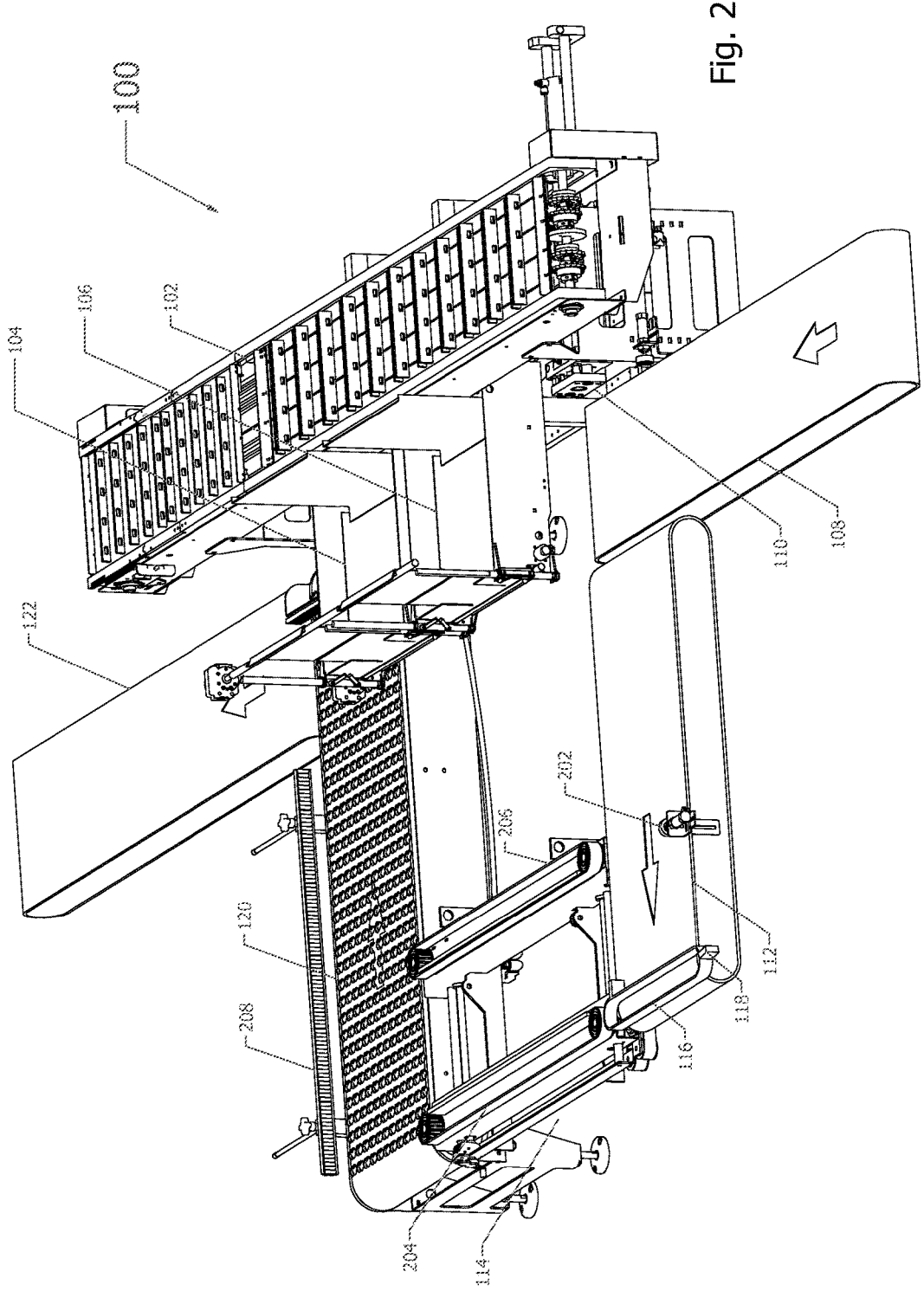
FIG. 2 is a perspective view of the example vertical load case packer, showing a product in-feed conveyor, a tipping conveyor assembly and two bucket assemblies to receive product to be side-loaded into cases pivoted to orient a vertical or top opening to face horizontally.

FIG. 2 is a perspective view of the example vertical load case packer 100, showing additional detail of several assemblies. A clamp 202 on the lateral transit conveyor 112 prevents case(s) from advancing to the end of the lateral transit conveyor 112 until an earlier case has moved off the lateral transit conveyor 112 and is indexed onto the tipping conveyor assembly 114. Additionally, the clamp 202 holds a case in place to form a wall opposite the indexing assembly 116 to regulate passage of a case between the clamped case and the indexing assembly.

In the example shown, the tipping conveyor assembly 114 includes an adjustable servo-driven side belt 204 and a fixed servo-driven side belt 206. In other examples, either or both side belts could be adjustable. The adjustability allows the distance between the side belts to be controlled, to thereby fit larger and smaller cases. Additionally, the distance between the side belts 204, 206 may be adjusted to regulate force applied to the case, which may require regulation based on the weight of the loaded case and other factors. The servo-driven belts 204, 206 may be controlled by programming to locate one or more cases as desired within the tipping conveyor assembly 114. In a typical configuration, the case(s) will be oriented as indicated by a location and/or position of each of one or more bucket assemblies 104, 106.

In the example shown, the loaded case lateral transit conveyor 120 may include a guide rail 208. In operation, a loaded case entering the loaded case lateral transit conveyor 120 advances until it contacts the guide rail 208. Upon contact, the case proceeds in parallel with the guide rail (e.g., rubbing against the guide rail) until it reaches the out-feed conveyor 122.

Figure 3:
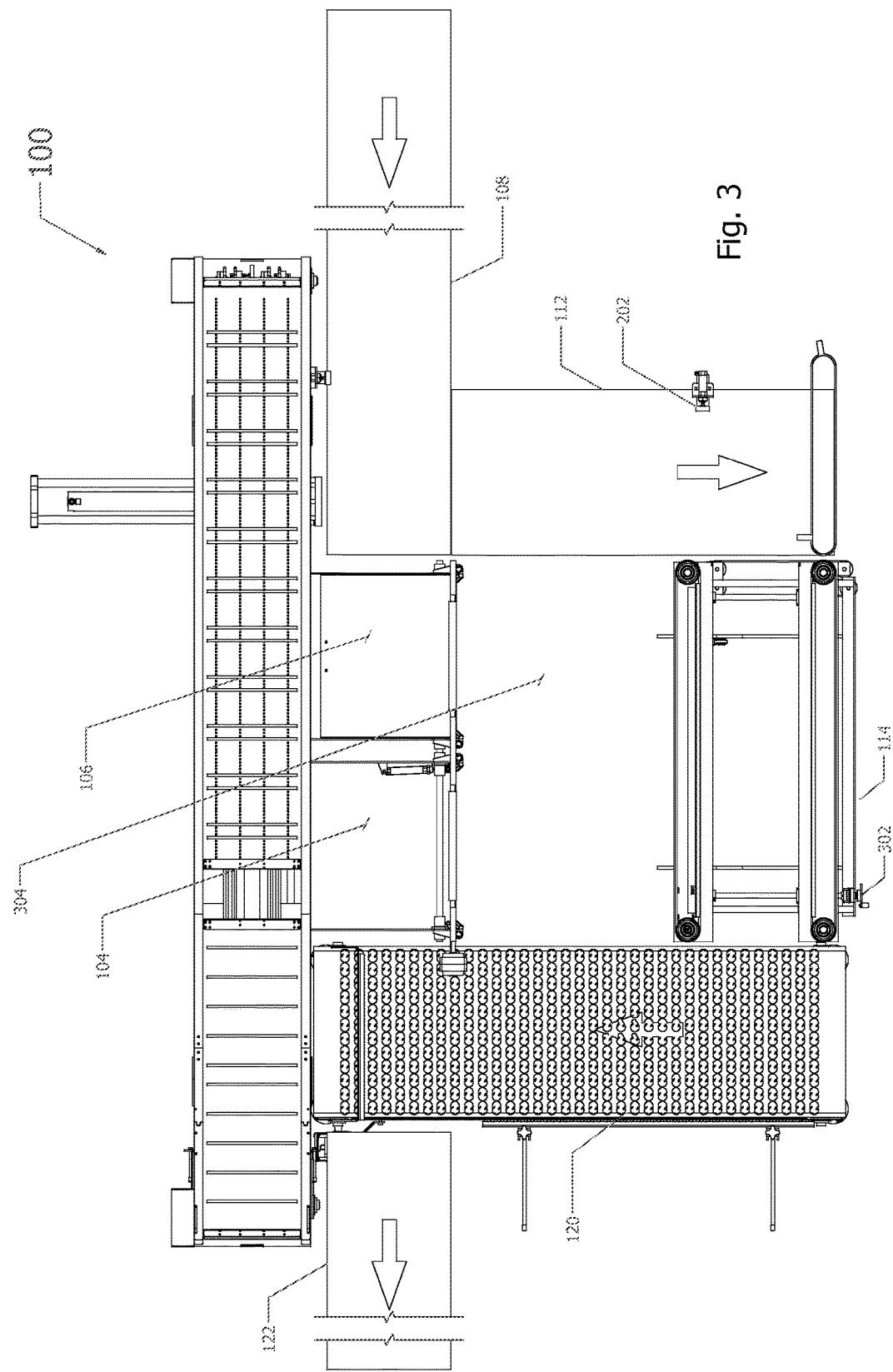
FIG. 3 is an orthographic or plan view of the example vertical load case packer, showing a path by which cases traverse the system and showing the tipping conveyor assembly adjusted to a location sufficiently distant from the two bucket assemblies to allow larger cases to be side-loaded.

FIG. 3 is an orthographic or plan view of the example vertical load case packer 100. The orthographic view shows an example adjustment mechanism (e.g., crank 302) that adjusts spacing between the side belts 204, 206 of the tipping conveyor assembly 114. The view also shows the space 304 between the tipping conveyor assembly 114 and the bucket assemblies 104, 106. By moving the tipping conveyor assembly 114 (e.g., on guide rod 604 and bushings 606 seen in FIG. 6, and powered by motor 802 and belt 804 seen in FIG. 16) toward the bucket assemblies 104, 106, the space 304 is reduced to a size appropriate for smaller cases to be tipped toward the bucket assemblies for filling. Similarly, by moving the tipping conveyor assembly 114 away from the bucket assemblies 104, 106, the space 304 is increased to a size appropriate for larger cases to be tipped toward the bucket assemblies for filling. Traveling on the loaded-case lateral-transit conveyor 120, cases may bump into a side guide or railing before making the right angle transfer onto the out-feed conveyor 122.

Figure 4:
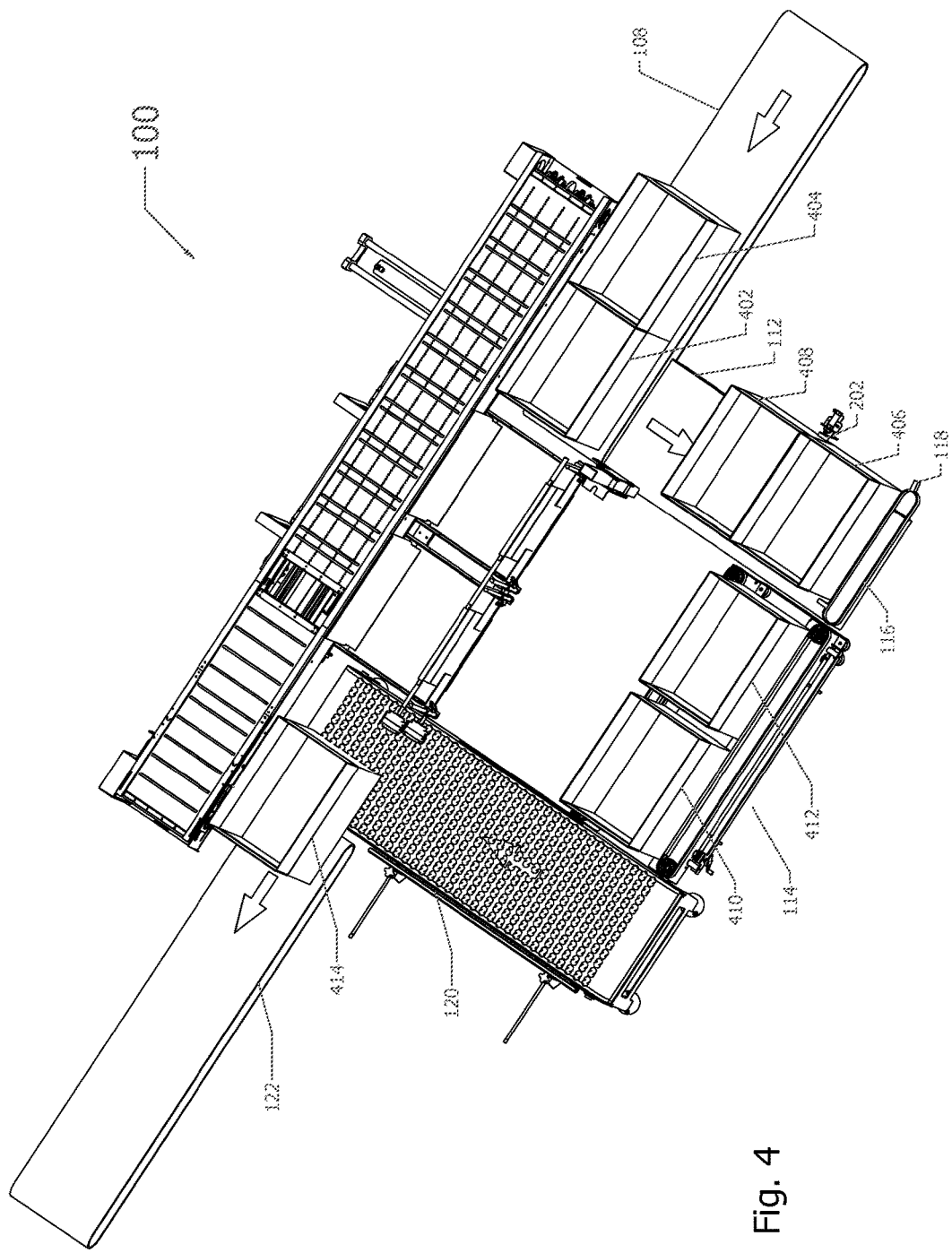
FIG. 4 is a perspective view showing a number of cases moving through the vertical load case packer, including two cases on the tipping conveyor assembly and five other cases in different positions.

FIG. 4 is a perspective view showing a number of cases moving through the vertical load case packer 100. Two empty cases 402 and 404 are located on the case in-feed conveyor 108. The case in-feed conveyor 108 may rub on the bottom of the cases 402, 404 when they stop moving after traversing the conveyor. When the kicker 110 (see FIGS. 1 and 2) ejects case 402, case 404 will advance to take the place of case 402. Two empty cases 406 and 408 are located on the lateral transit conveyor 112. Case 406 has advanced until it contacted the indexing assembly 116, while case 408 has advanced until it contacted case 406 and is clamped by clamp 202. When case 406 is needed, the indexing assembly 116 will advance it onto the tipping conveyor assembly 114. In the view shown, two cases 410, 412 are located on the tipping conveyor assembly 114. A case 414, full of product, is shown leaving the loaded case lateral transit conveyor 120 and entering the out-feed conveyor 122.

Figure 5:
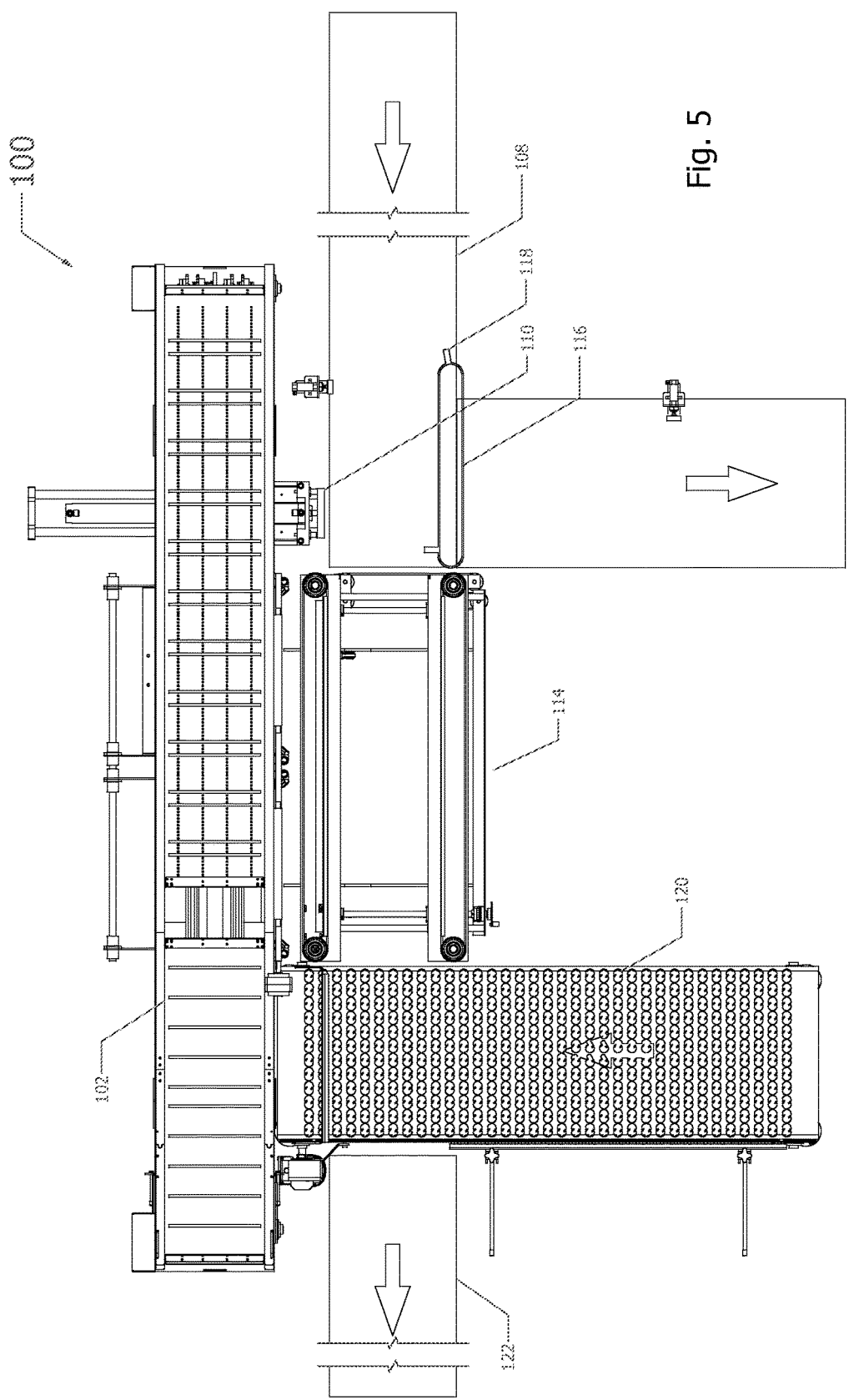
FIG. 5 is an orthographic or plan view of the example vertical load case packer, showing the tipping conveyor moved to a position adjacent to the product in-feed conveyor to thereby position cases for top-loading of product (as opposed to the side-loading of product, as illustrated by FIGS. 1-4).

FIG. 5 is an orthographic or plan view of the example vertical load case packer 100, showing the tipping conveyor assembly 114 moved to a position adjacent to the product in-feed conveyor 102 to thereby position cases for top-loading of product (as opposed to the side-loading of product, as illustrated by FIGS. 1-4). Thus, the tipping conveyor assembly 114 has been moved to a location that is in-line with the empty-case in-feed conveyor 108 and the full-case out-feed conveyor 122. In this configuration, the bucket assemblies 104, 106 have been removed. The cases moving through the tipping conveyor assembly 114 will not be tipped and will be top loaded by a picking machine (not shown) such as the picking machine that loaded the bucket assemblies. In this configuration, the tipping conveyor assembly 114 will not tip or pivot, and the cases will move through the system 100 with the tops of the case remaining upwardly oriented. Cases will continue to be indexed from the in-feed conveyor 108 by the indexing assembly 116. The flight lugs 118 of the indexing assembly 116 will block a case from entering the tipping conveyor assembly 114 until a correct time, and then push the case onto the tipping conveyor assembly. Cases will cross the loaded case lateral transit conveyor 120 by operation of its bi-directional active roller belt construction.

Figure 6:
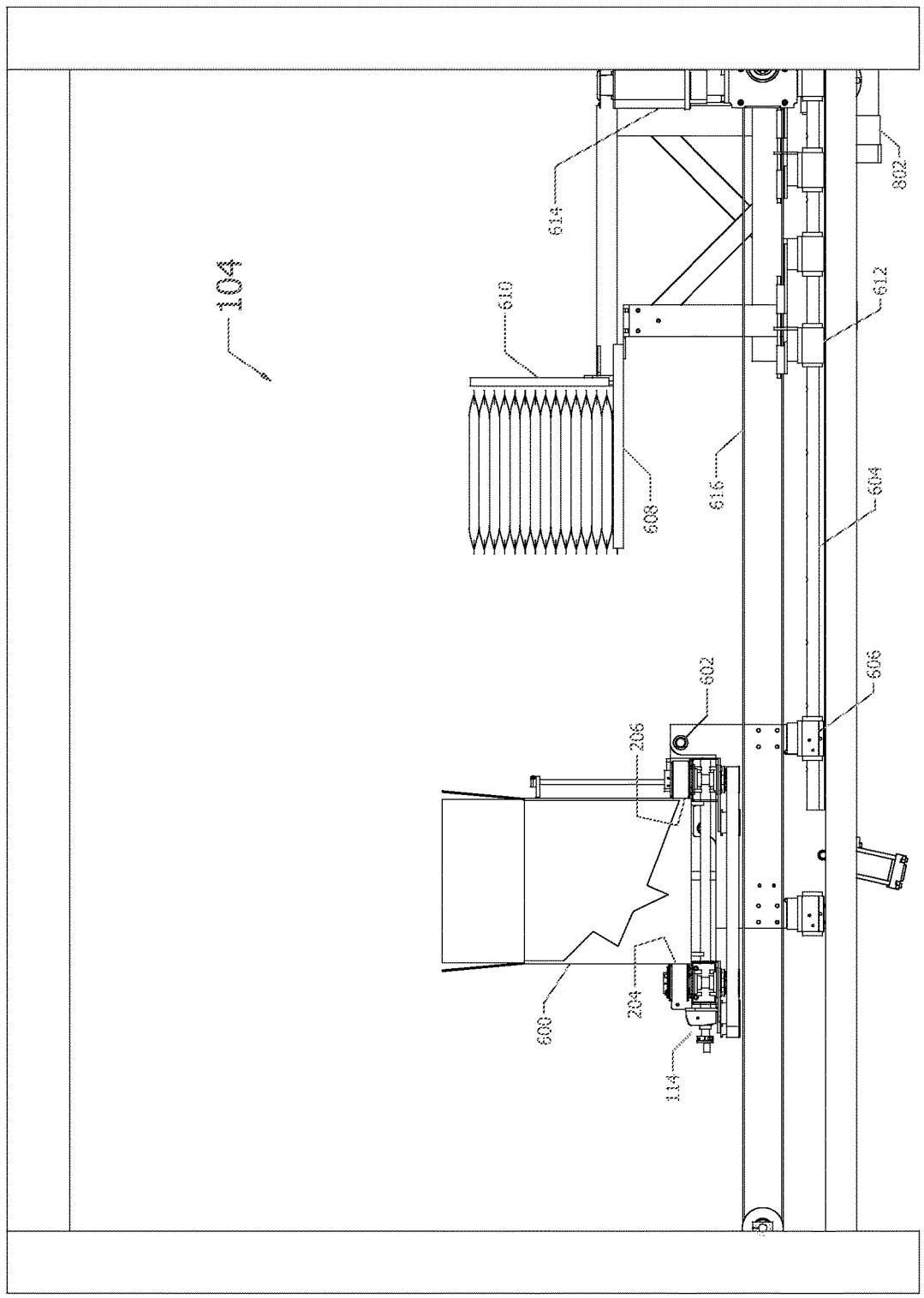
FIG. 6 shows a side orthographic view of a case positioned on the tipping conveyor assembly prior to tipping 90 degrees toward the product, which is supported by a sliding bottom plate adjacent to a pusher plate.

FIG. 6 shows a side orthographic view of the bucket assembly 104 and tipping conveyor assembly 114, wherein a case 600 is positioned on the tipping conveyor assembly 114 prior to tipping 90-degrees toward the bucket assembly 104. The case 600 is friction-fit between the side belts 204, 206 of the tipping conveyor assembly 114. The tipping conveyor assembly 114 has not yet tipped, pivoted or rotated about the pivot 602. The tipping conveyor assembly 114 is configured for movement along a guide rod 604 using bushings 606. In some applications, the tipping conveyor assembly 114 is and does not travel on rod 604 until it is reset for use with a different case size. In others applications, the tipping conveyor assembly 114 may be required to move away from the bucket assembly on guide rod 604 as the case is tipped back to its horizontal position to ensure that the product stays in the case.

Portions of the bucket assembly 104 are shown (with other portions shown in FIGS. 17 and 18), including a sliding bottom plate 608 and a pusher plate 610. The bucket assembly 104 may be moved laterally along horizontal guide rod 604, supported by bushings 612 and driven by motor 614 and belt 616.

Figure 7:
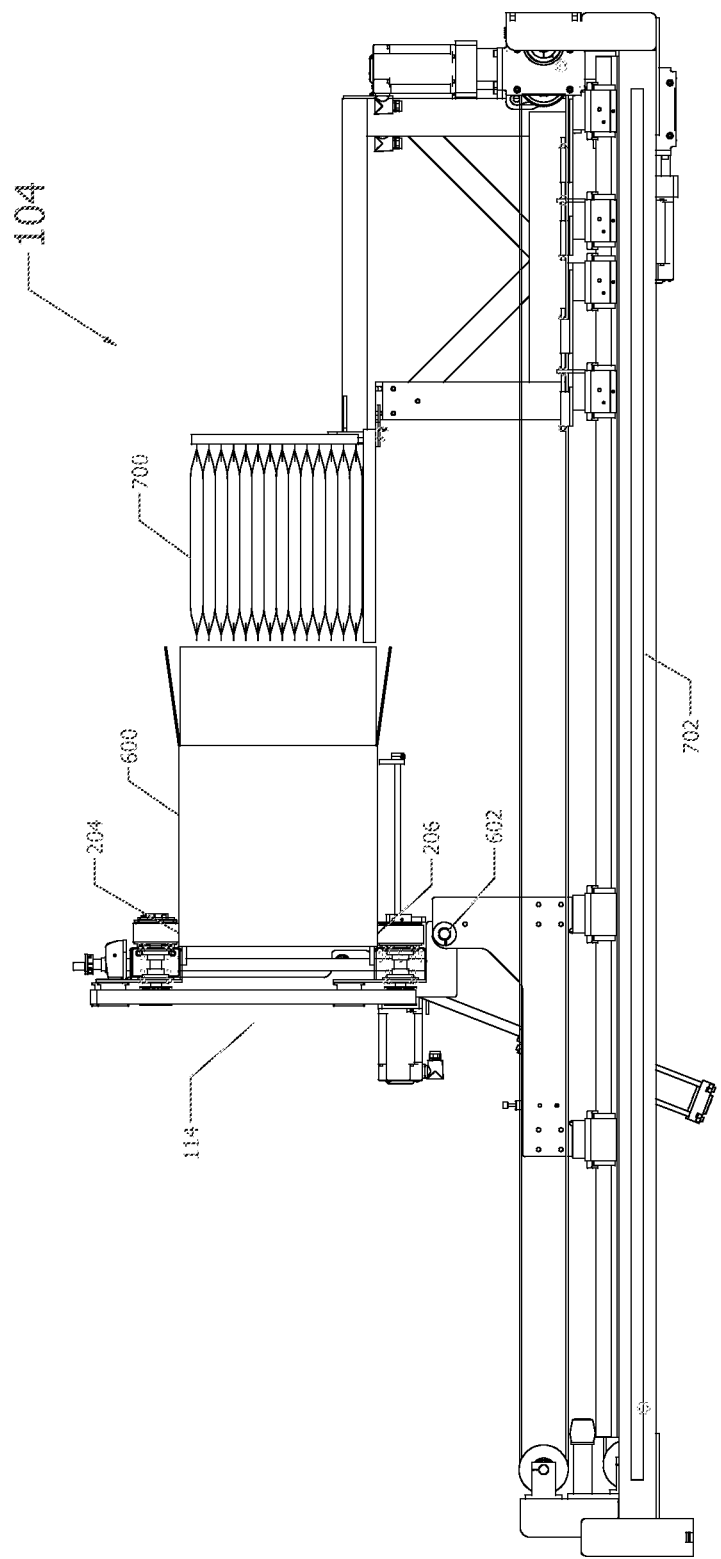
FIG. 7 shows a side orthographic view in which the case is rotated 90 degrees by the tipping conveyor assembly thereby locating the product near the opening of the case.

FIG. 7 shows a side orthographic view of the bucket assembly 104 in which the case 600, supported by the side belts 204, 206 of the tipping conveyor assembly 114, has rotated 90-degrees about pivot 602 to orient the opening of the case 600 in a horizontal direction toward the bucket assembly 104 and product 700.

Figure 8:
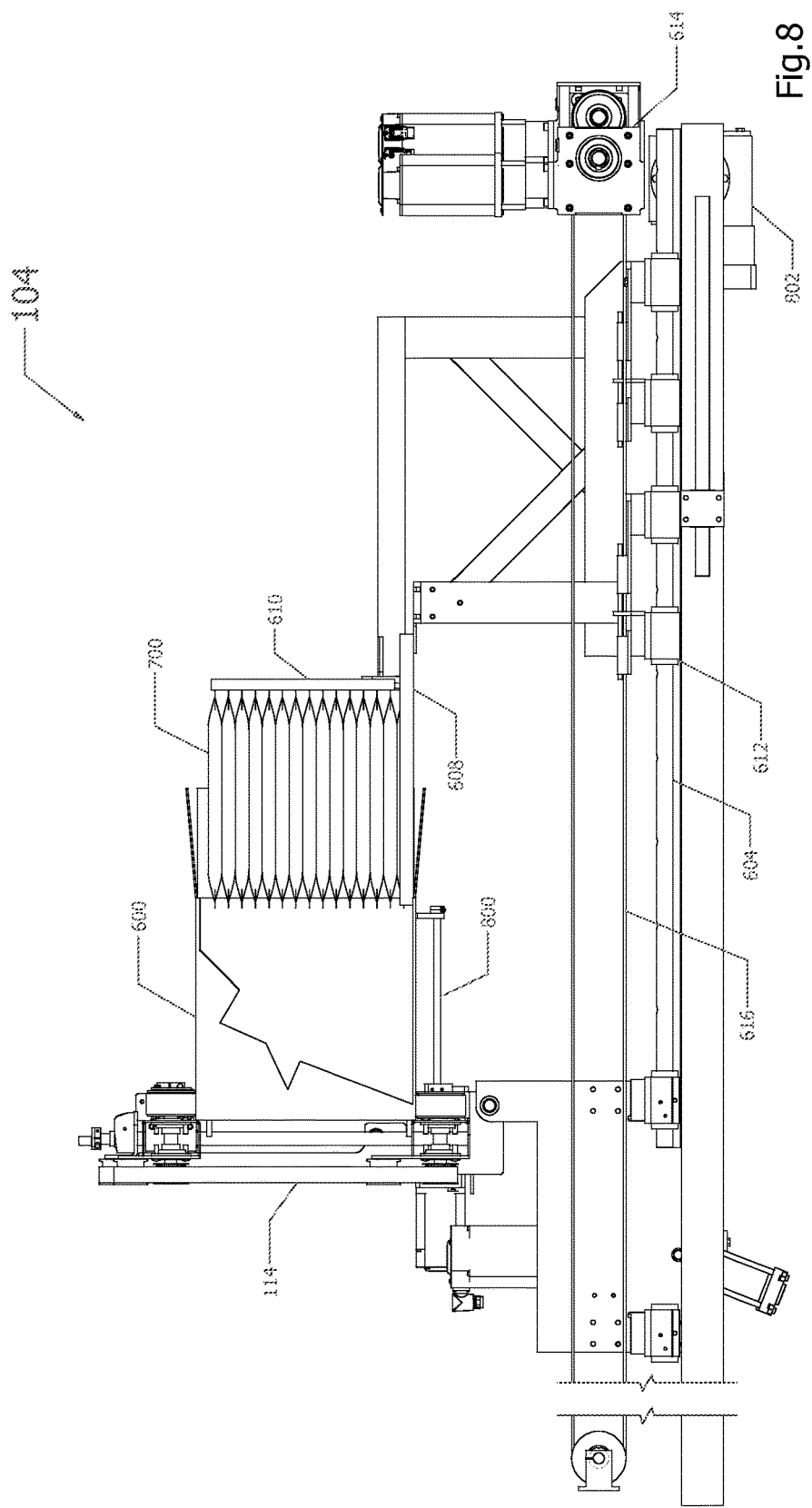
FIG. 8 shows a side orthographic view in which the product has just begun to advance into the horizontally oriented opening of the case.

FIG. 8 shows a side orthographic view of the bucket assembly 104 and tipping conveyor assembly 114 in which the sliding bottom plate 608 supporting product 700 and pusher plate 610 of bucket assembly 104 has moved to the left (from the perspective of the drawing) along the guide rod 604 on bearings 612 by operation of the motor 614 and belt 616 to position the product 700 next to, but not yet inside, the opening of the case 600 supported by tipping conveyor assembly 114. The product 700 continues to be supported by the sliding bottom 608 and stabilized by the pusher plate 610 (and sidewalls, seen in FIGS. 17 and 18). A support 800 (not previously illustrated), supports the case 600 as the product 700 is inserted.

Figure 9:
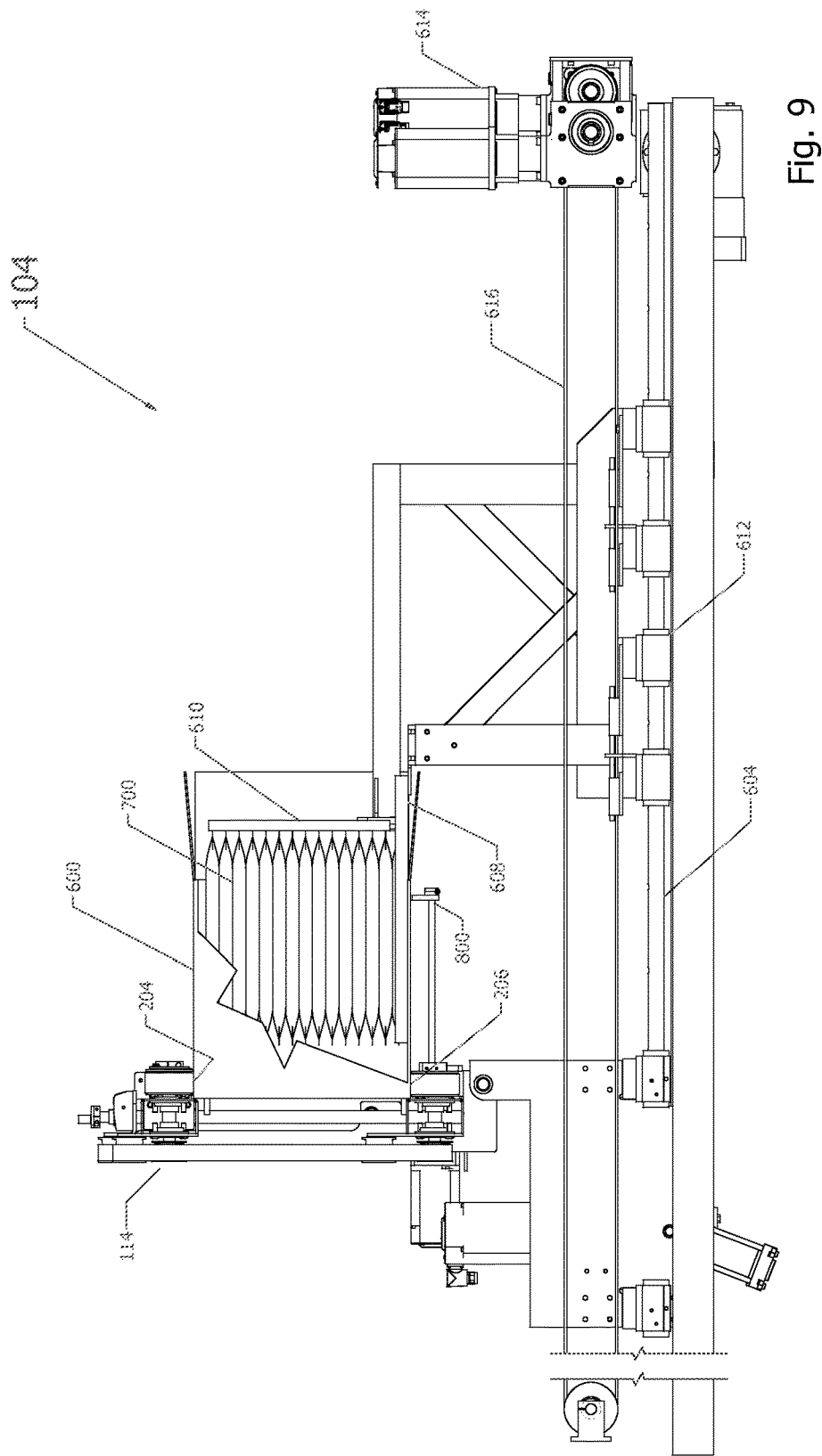
FIG. 9 shows a side orthographic view in which the product has advanced most of the way into the horizontally oriented case.

FIG. 9 shows a side orthographic view of the bucket assembly 104 and tipping conveyor assembly 114 in which the product 700, supported by the sliding bottom plate 608 and stabilized by the pusher plate 610, has advanced into the horizontally oriented case 600. The product 700 was advanced as the bucket assembly 104 continues to move on rod 604 supported by bushings 612 and driven by motor 614 and belt 616. As the product 700 moves into the case 600, the case is held in position by the tipping conveyor assembly 114 and side belts 204 and 206 and support 800.

Figure 10:
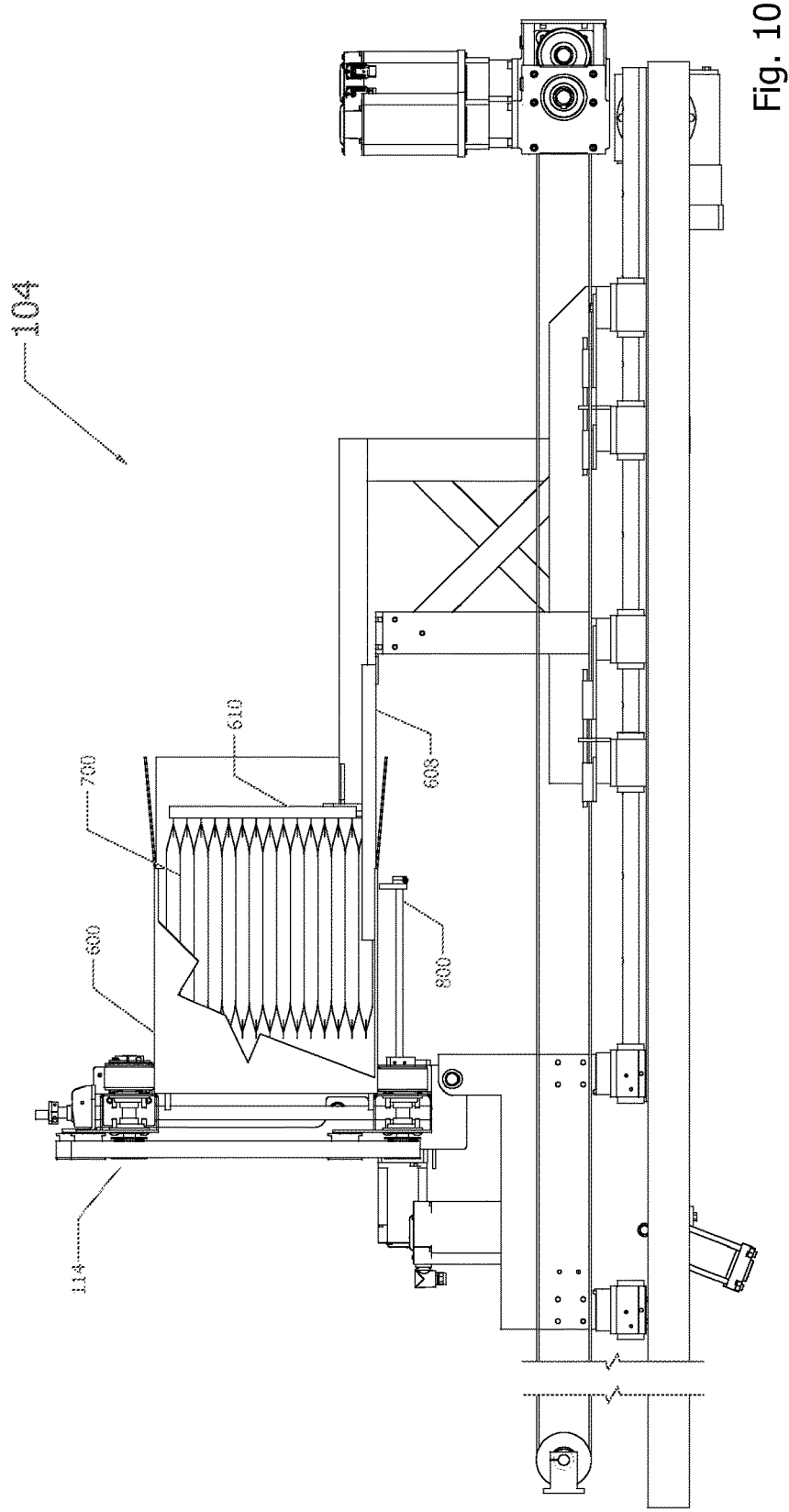
FIG. 10 shows a side orthographic view in which the sliding bottom plate has begun to withdraw from the case and the pusher plate is preventing withdrawal of the product.

FIG. 10 shows a side orthographic view of the bucket assembly 104 and tipping conveyor assembly 114 in which the sliding bottom 608 has begun to withdraw from the case 600. The pusher plate 610 remains stationary or pushes product 700 forward, thereby preventing withdrawal of the product 700 as the sliding bottom 608 retracts. The timing at which the sliding bottom plate 608 is withdrawn may be based at least in part on the size of the case 600 and the size of the product 700. If the fit it tight, the sliding bottom plate 608 may not be inserted into the case 600. If the fit is less tight, the sliding bottom plate 608 may be partially inserted into the case 600 and may be withdrawn before the product 700 is fully inserted into the case. If the fit is loose, the sliding bottom plate 608 may be fully or almost fully inserted into the case 600 and may be withdrawn when the product 700 is fully or almost fully inserted into the case. In the view shown, the product 700 was partially inserted into the case 600 when the tightness of the case required the withdrawal of the sliding bottom plate 608. The sizes of the case and product may be considered when programming the operation of the bucket assembly 104 and its components, including the sliding bottom plate 608, the pusher plate 610, motor 614 and/or other components.

Figure 11:
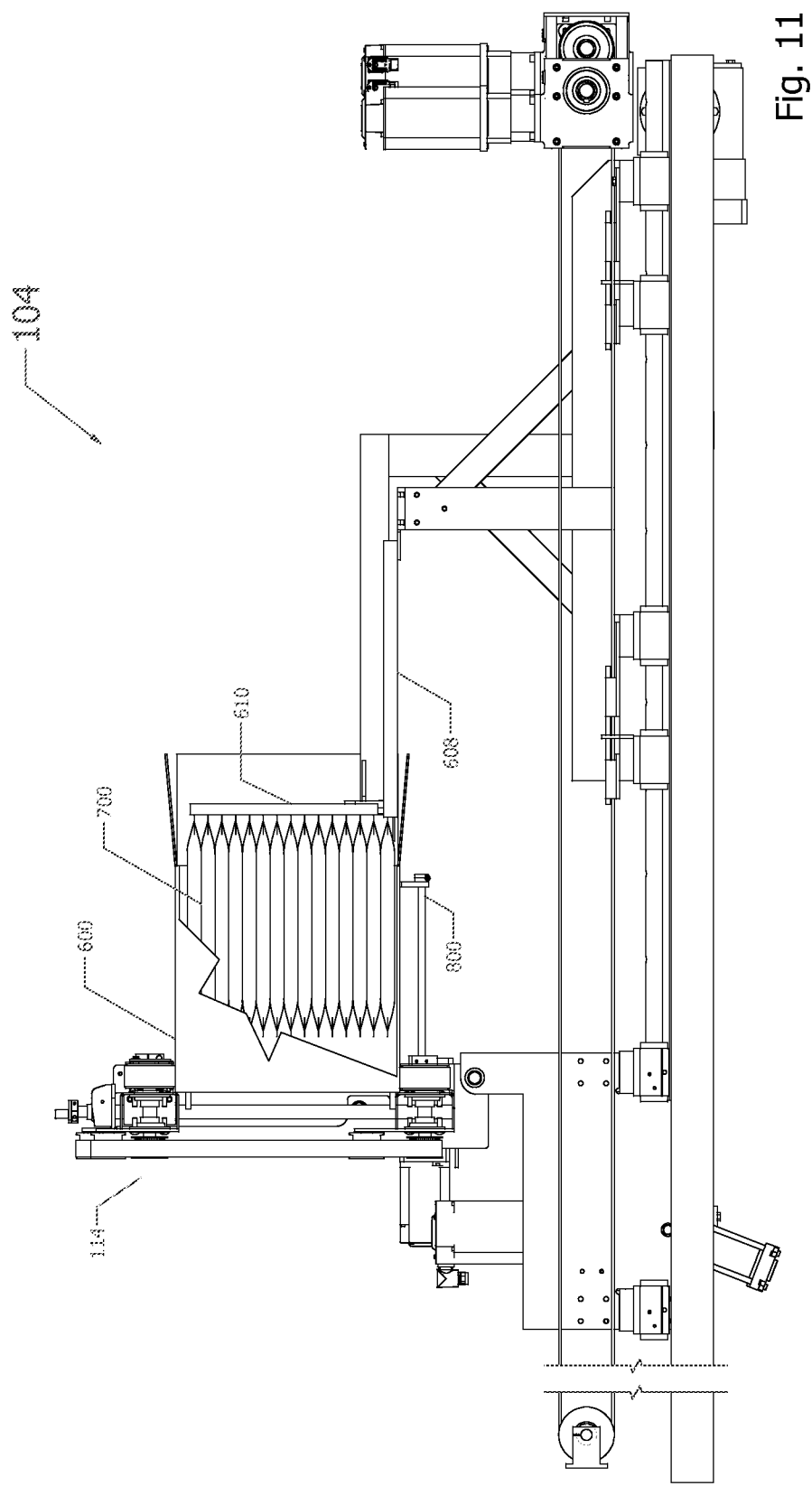
FIG. 11 shows a side orthographic view in which the sliding bottom plate has fully withdrawn from the case and the pusher plate continues to prevent withdrawal of the product.

FIG. 11 shows a side orthographic view of the bucket assembly 104 and tipping conveyor assembly 114 in which the sliding bottom plate 608 has fully withdrawn from the case 600 and the pusher plate 610 continues to prevent withdrawal of the product. The pusher plate 610 may push the product 700 fully into the case either while the sliding bottom plate 608 is withdrawing or after the sliding bottom plate has fully withdrawn.

Figure 12:
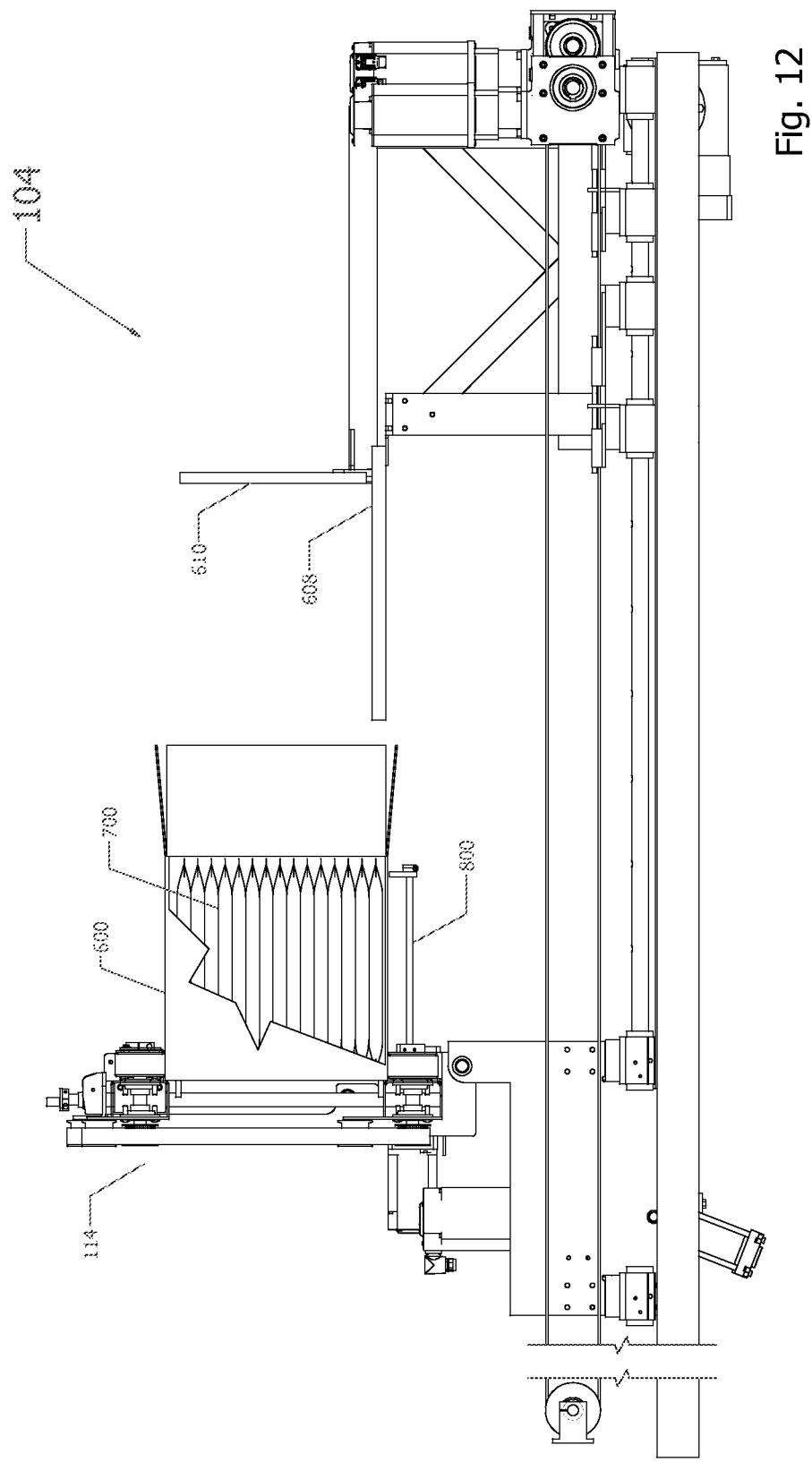
FIG. 12 shows a side orthographic view in which the pusher plate has fully pushed the product into the case and the bucket assembly (including sliding bottom plate and pusher plate) has been withdrawn from the case.

FIG. 12 shows a side orthographic view of the bucket assembly 104 and tipping conveyor assembly 114, in which the pusher plate 610 has fully pushed the product 700 fully (or almost fully) into the case 600. The sliding bottom plate 608 and pusher plate 610 have been withdrawn from the case. At this point, the case 600 is loaded with product 700, and is ready to be turned right side up.

Figure 13:
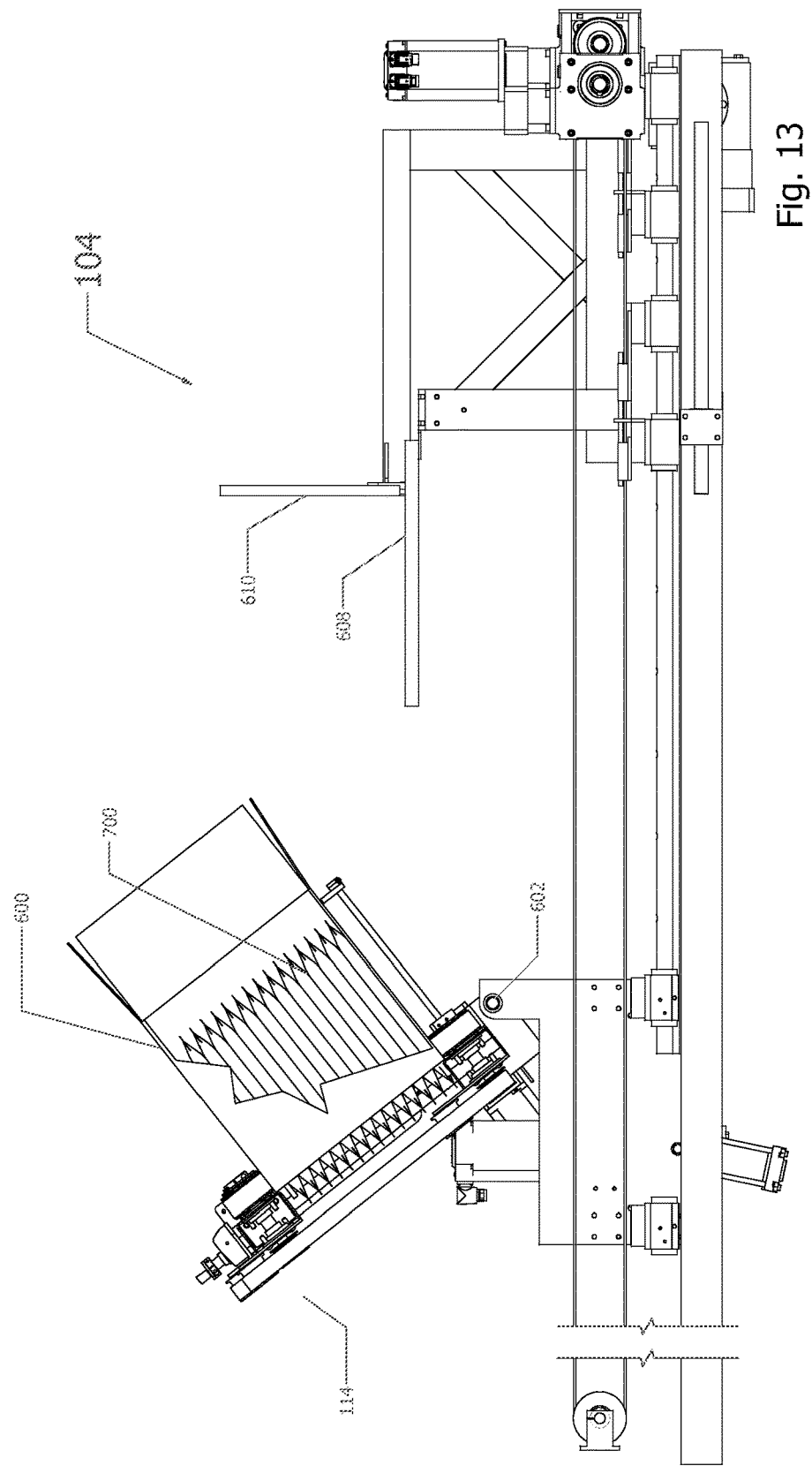
FIG. 13 shows a side orthographic view in which the tipping conveyor assembly has partially rotated in a manner that will orient the opening of the case in a vertical direction.
Figure 14:
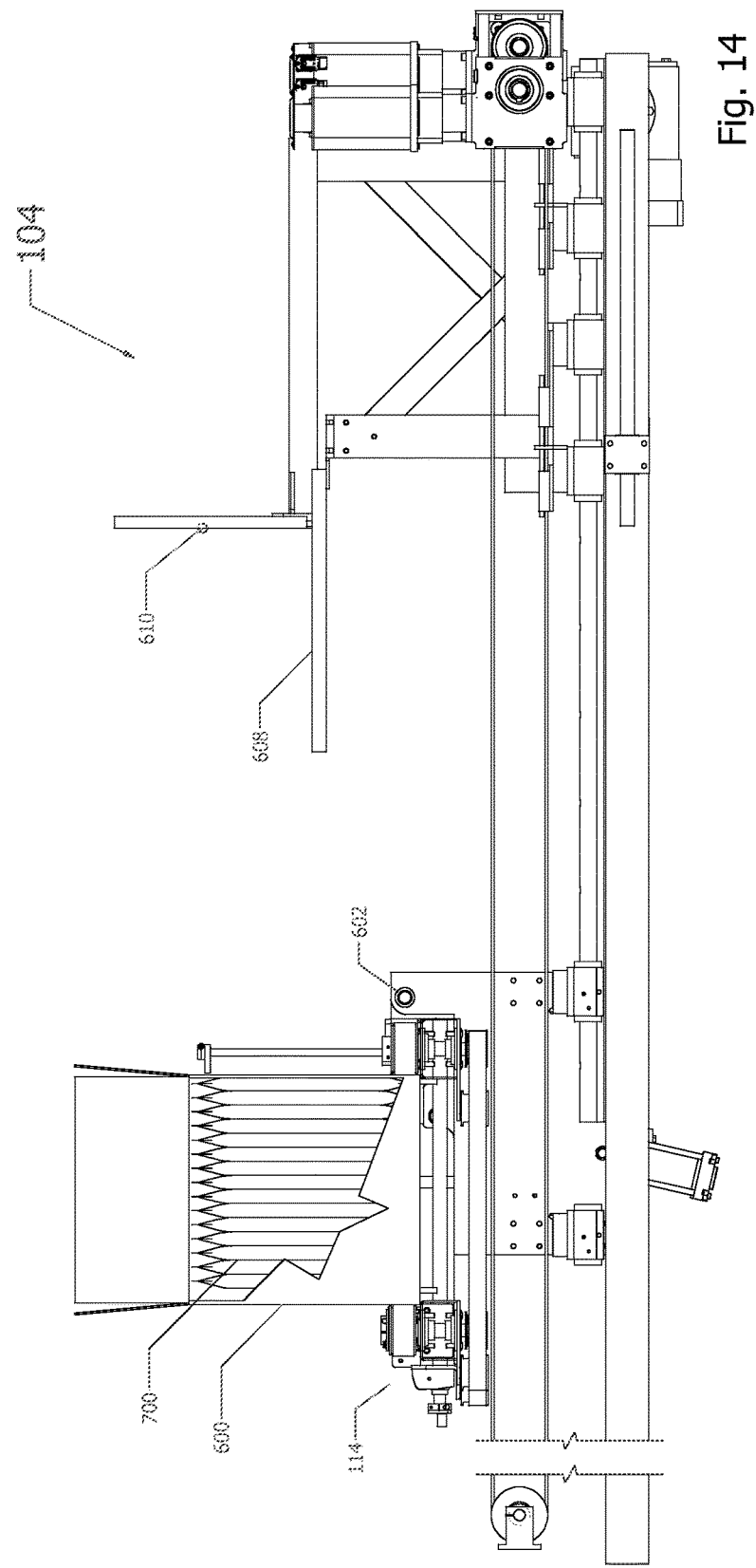
FIG. 14 shows a side orthographic view in which the tipping conveyor assembly has fully rotated and the opening of the case is oriented in a vertical direction.

FIG. 13 shows a side orthographic view in which the tipping conveyor assembly 114 has partially rotated about pivot 602 in a manner that will orient the opening of the case 600 in a vertical direction. FIG. 14 shows a side orthographic view in which the tipping conveyor assembly 114 has fully rotated about the pivot 602 and the opening of the case 600 is oriented in a vertical direction. If the product 700 was not fully inserted into the case 600, gravity will finish the job at this point.

Figure 15:
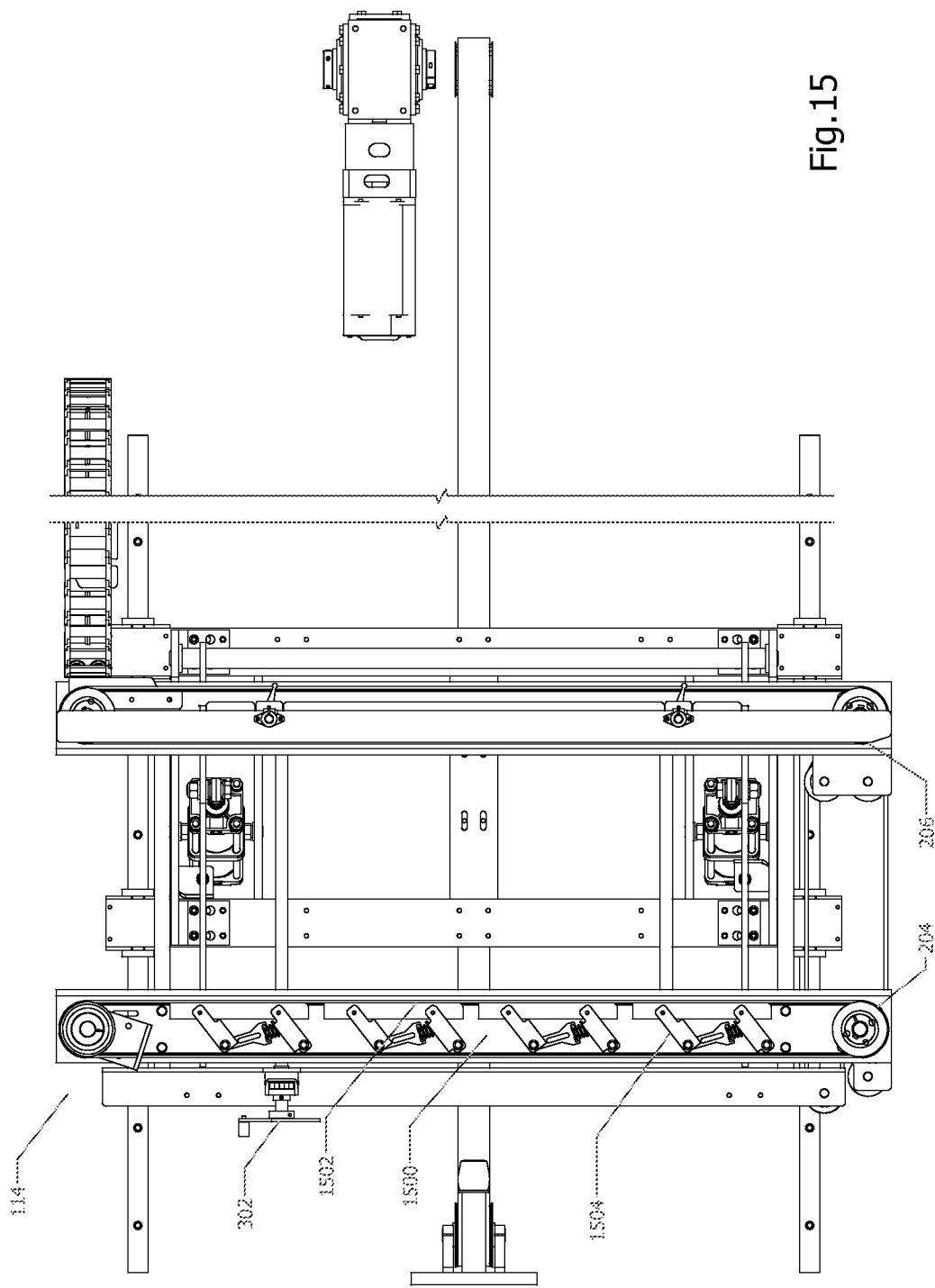
FIG. 15 is an orthographic or plan view of the tipping conveyor assembly, showing a belt adjustment assembly configured to allow variation in a width of the tipping conveyor assembly and to thereby adapt to cases of differing sizes and/or to the need to apply greater or lesser pressure to the sides of cases.

FIG. 15 is an orthographic or plan view of the tipping conveyor assembly 114, showing a spring-loaded belt adjustment or compensation assembly 1500 configured to adjust or compensate for slight variations in the widths of different cases traveling between the belts 204 and 206. In the example shown, one or more slide bars 1502 are pressed against the inside of belt 204 to control spacing between belts 206 and 206. The slide bars 1502 slide against an inside surface of the belt 204, according to the adjustment of parallel links or tension regulators 1504. The arrangement of the belt adjustment assembly 1500 is for purposes of illustration only, and other arrangements could alternatively be utilized.

Figure 16:
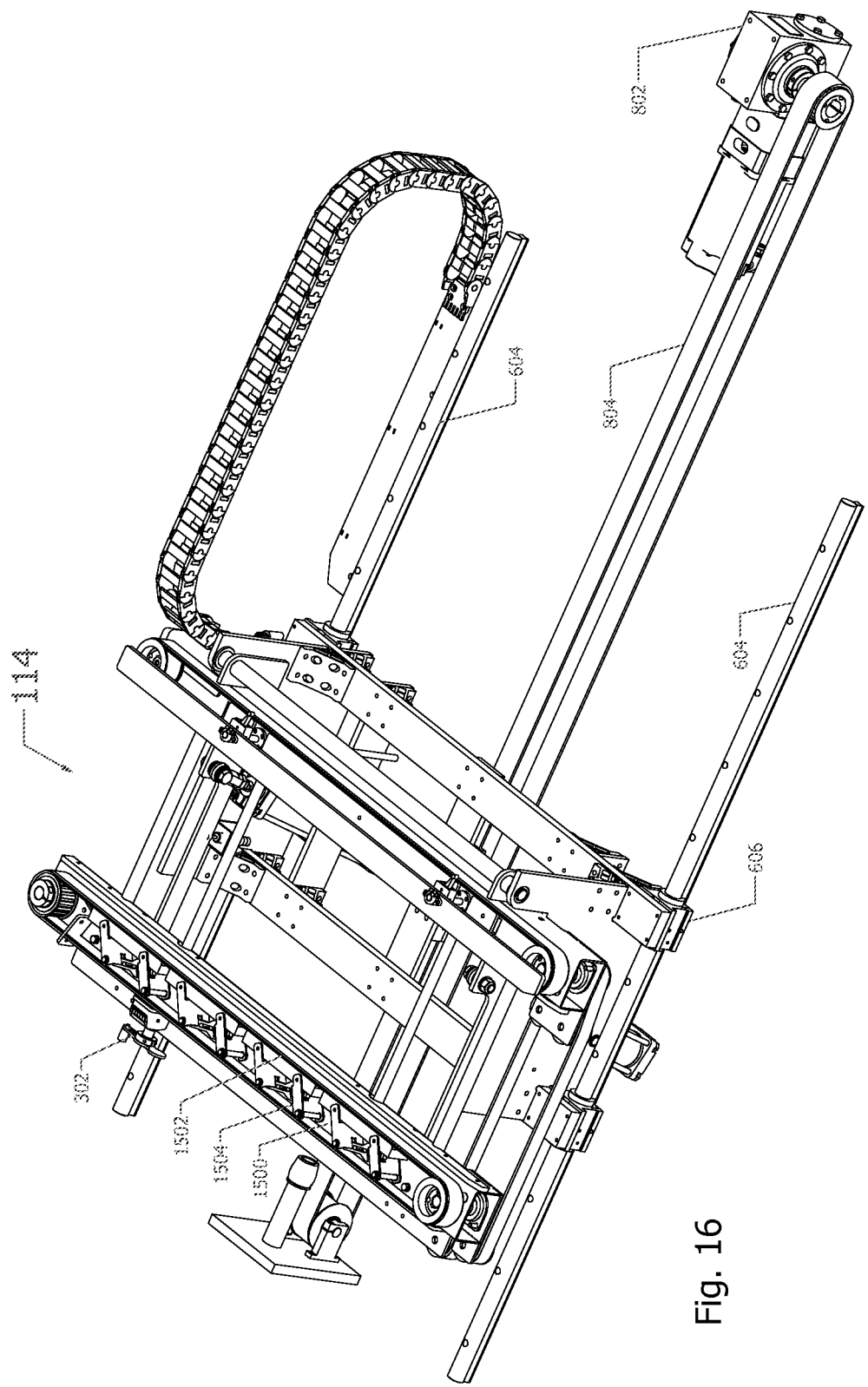
FIG. 16 is a perspective view of the tipping conveyor assembly, showing structures and techniques to position the tipping conveyor assembly with respect to one or more bucket assemblies and showing structures and techniques to adjust the separation of the side belts of the tipping conveyor assembly.

FIG. 16 is a perspective view of the tipping conveyor assembly 114, showing a location adjustment assembly to position the tipping conveyor assembly with respect to one or more bucket assemblies. In the example shown, the slide rods 604 support the tipping conveyor assembly 114 on bushings 606. Operation of the motor 802 and belt 804 allows the tipping conveyor assembly 114 to be positioned a desired distance from one or more bucket assemblies. The distance may be based at least in part on a size of cases to be packed. The belt adjustment assembly 1500 is seen in the perspective view, including the slide bars 1502 and parallel links or tension regulators 1504.

FIG. 17 is a perspective view of a bucket assembly 104 with front flaps open to allow product to exit. The bucket assembly 104 includes fixed left and right sides 1702 and 1704. The sliding bottom plate 608 and a pusher plate 610 are not shown in this view. The bucket assembly 104 includes a top flap 1706 and a bottom flap 1708, and a left flap 1710 and a right flap 1712. All four flaps are opened and closed by an actuator assembly 1714. When the flaps 1706-1712 open, they push open the flaps of a case 600 (not shown) to allow product inside the bucket assembly 104 to enter the case.

FIG. 18 is a perspective view of a bucket assembly with flaps 1706-1712 closed by the actuator assembly 1714.

When the flaps are closed, product may be placed into the bucket assembly, such as by a picker (not shown).

Example Methods

FIGS. 1-18 show a progression of events that illustrate example methods and operation of a vertical load case packer to side-load product (i.e. put product into a case having an open top oriented to the side or horizontally). The methods and operation may be performed and/or directed by any desired integrated circuit, logic devices, application specific integrated circuit, software programming, computer readable media device, etc. The example methods may be implemented at least in part using structures and operations illustrated in FIGS. 1-18. However, the methods contain general applicability, and are not limited by other drawing figures and/or prior discussion. The example operation shown by FIGS. 1-18 may be implemented by software and/or hardware structures or devices that are configured to operate a vertical load case packer. In one example, one or more functional blocks may be implemented by aspects including a vertical load case packer controlled by a microprocessor, a ladder logic device, a microcontroller or other logic device, etc., one or more memory devices, computer-readable media, application specific integrated circuits, software blocks, subroutines, programs, etc. Computer-readable media, as the term is used herein, includes, at least, two types of computer-readable media, namely computer storage media and communications media. Computer storage media devices include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. Computer storage media may be non-transitory in nature. In contrast, communication media may embody computer readable instructions, data structures, program modules, or other data in a modulated data signal, such as a carrier wave, or other transmission mechanism. As defined herein, computer storage media and/or computer storage media device(s) do/does not include communications media.

Example Structures and Methods

An indexing assembly is configured to advance one or more cases, separated according to a selectable spacing, onto a tipping conveyor assembly.

In example operation, programming controls operation of servo motor(s) of the indexing assembly to advance flight lugs to propel cases onto the tipping conveyor assembly.

A tipping conveyor assembly is configured to receive one or more cases with an open end oriented vertically. A pivot point may allow pivoting or "tipping" of the tipping conveyor assembly to position the case(s) with the open end oriented horizontally. A bucket assembly is configured to load the case while horizontal. Once loaded, the tipping conveyor assembly may return the case(s) to an upright orientation, wherein the open top is oriented upwardly.

In operation, the tipping conveyor assembly is positioned on adjustment rods a distance from the bucket assembly that is based at least in part on a size of a case to be packed. The tipping conveyor assembly may pivot from a position wherein a case opening is vertically oriented to a position wherein the case opening is horizontally oriented for loading with product by a bucket assembly. The tipping conveyor assembly may then pivot to a position wherein the case is vertically oriented.

In one example, a bucket assembly includes a sliding bottom plate and a pusher plate.

In example operation, the sliding bottom plate supports and moves product into a case having the open side horizontally oriented. The pusher plate prevents the product from withdrawing, as the sliding bottom plate is withdrawn. The pusher plate may further advance the product into the case, and then withdraw, leaving the product fully inserted in the case.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A vertical load case packer, comprising:
   a bucket assembly to receive product and to deliver the product to a case;
   a tipping conveyor to support the case;
   an adjustment assembly to adjust the tipping conveyor horizontally and to position the tipping conveyor at a desired distance from the bucket assembly;
   side belts to move the case within the tipping conveyor and to grip the case when the tipping conveyor pivots, wherein the side belts are configured with a spring-loaded belt assembly to adjust for variation in width of cases; and
   a pivot to rotate the tipping conveyor between a position wherein open ends of the case are oriented upwardly and a position wherein open ends of the case are oriented horizontally to receive the product from the bucket assembly.

2. The vertical load case packer of claim 1, additionally comprising:
   an indexing assembly to advance the case into a selected position within the tipping conveyor.

3. The vertical load case packer of claim 1, wherein the bucket assembly comprises:
   actuated flaps sized to open flaps of the case prior to delivery of product to the case.

4. The vertical load case packer of claim 1, wherein the adjustment assembly comprises:
   a slide rod to allow horizontal movement of the tipping conveyor in a direction perpendicular to a direction of case travel on the tipping conveyor;
   wherein the desired distance between the tipping conveyor and the bucket assembly is adjustable based at least in part on a height of the case.

5. The vertical load case packer of claim 1, wherein the bucket assembly comprises:
   a sliding bottom plate to support product and to advance the product to the case; and
   a pusher plate to prevent the product from withdrawing from the case as the sliding bottom plate is withdrawn and to fully advance the product into the case.

6. The vertical load case packer of claim 1, additionally comprising:
   an empty case lateral conveyor to deliver the case to the tipping conveyor; and a loaded case lateral conveyor to receive the case from the tipping conveyor.

7. The vertical load case packer of claim 1, additionally comprising:
a tension regulator, within the tipping conveyor, to adjust for variations in widths of different cases traveling between the side belts.

8. The vertical load case packer of claim 1, additionally comprising:
a loaded-case lateral-transit conveyor;
wherein the loaded-case lateral-transit conveyor is configured to receive the case at a side location of the loaded-case lateral-transit conveyor that is based at least in part on the desired distance between the tipping conveyor and the bucket assembly.

9. A vertical load case packer, comprising:
a bucket assembly to receive product and to deliver the product to a case, the bucket assembly comprising:
a sliding bottom plate to support product and to advance the product to the case; and
a pusher plate to prevent the product from withdrawing from the case as the sliding bottom plate is withdrawn and to fully advance the product into the case;
a tipping conveyor to support the case to receive the product from the bucket assembly;
an indexing assembly to advance the case into a selected position within the tipping conveyor; and
side belts to move the case within the tipping conveyor and to grip the case when the tipping conveyor pivots, wherein the side belts are configured with a spring-loaded belt assembly to adjust for variation in width of cases.

10. The vertical load case packer of claim 9, additionally comprising:
an adjustment assembly to adjust the tipping conveyor horizontally and to position the tipping conveyor at a desired distance from the bucket assembly, wherein the desired distance is based at least in part on a size of the case.

11. The vertical load case packer of claim 9, wherein the side belts are configured to adjust for differences in widths of different cases.

12. The vertical load case packer of claim 9, wherein each bucket assembly comprises:
actuated flaps sized to open flaps of the case prior to delivery of product to the case.

13. The vertical load case packer of claim 9, wherein the indexing assembly comprises a drive belt and at least one flight lug.

14. The vertical load case packer of claim 9, wherein the tipping conveyor comprises:
a pivot to rotate the tipping conveyor between positions wherein open ends of the case are oriented upwardly and wherein open ends of the case are oriented horizontally to receive the product from the bucket assembly.

15. The vertical load case packer of claim 9, additionally comprising:
an empty case in-feed conveyor to deliver the case to the tipping conveyor; and
a loaded-case lateral-transit conveyor to receive the case from the tipping conveyor.

16. The vertical load case packer of claim 9, wherein the side belts comprise:
at least one tension regulator to adjust for variations in widths of different cases traveling between the side belts.

17. A vertical load case packer, comprising:
a bucket assembly comprising a sliding bottom plate and a pusher plate, wherein the bucket assembly configured to receive product and to deliver the product to a case;
a tipping conveyor to support the case;
an adjustment assembly to adjust the tipping conveyor horizontally and to position the tipping conveyor at a desired distance from the bucket assembly;
a pivot to rotate the tipping conveyor between a position wherein open ends of the case are oriented upwardly and a position wherein open ends of the case are oriented horizontally to receive the product from the bucket assembly; and
side belts to move the case within the tipping conveyor and to grip the case when the tipping conveyor pivots, wherein the side belts are configured with a spring-loaded belt assembly to adjust for variation in width of cases.

18. The vertical load case packer of claim 17, wherein a distance between the tipping conveyor and the bucket assembly is adjustable.

* * * * *